(12) United States Patent
Easton

(10) Patent No.: US 6,345,674 B1
(45) Date of Patent: Feb. 12, 2002

(54) TRACKED VEHICLE STEERING CONTROL SYSTEM WITH STEERING PUMP FEEDBACK

(75) Inventor: David Joseph Easton, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/648,470

(22) Filed: Aug. 23, 2000

(51) Int. Cl.[7] .................................................. B62D 11/00
(52) U.S. Cl. ................... 180/6.44; 180/403; 180/6.48; 701/41; 701/42
(58) Field of Search ................ 180/6.44, 6.48, 180/6.5, 6.7, 402, 403, 421, 442, 441; 701/41, 42

(56) References Cited

U.S. PATENT DOCUMENTS

| | | | | |
|---|---|---|---|---|
| 3,727,404 A | * | 4/1973 | Brewer | 60/430 |
| 5,390,751 A | * | 2/1995 | Puetz et al. | 180/6.48 |
| 5,611,405 A | * | 3/1997 | Ishino et al. | 180/6.44 |
| 5,787,374 A | * | 7/1998 | Ferguson et al. | 701/41 |
| 5,857,532 A | * | 1/1999 | Satzler | 180/6.2 |
| 5,921,335 A | * | 7/1999 | Straetker | 180/6.44 |
| 5,948,029 A | * | 9/1999 | Straetker | 701/41 |
| 5,975,224 A | * | 11/1999 | Satzler | 180/6.44 |
| 6,000,490 A | | 12/1999 | Easton | 180/402 |
| 6,039,132 A | | 3/2000 | Easton | 180/6.44 |
| 6,119,061 A | * | 9/2000 | Scheknel et al. | 701/42 |
| 6,170,584 B1 | * | 1/2001 | Mistry et al. | 180/6.44 |
| 6,208,922 B1 | * | 3/2001 | Easton | 701/41 |

FOREIGN PATENT DOCUMENTS

JP 11310149 * 11/1999

* cited by examiner

*Primary Examiner*—J. J. Swann
*Assistant Examiner*—David Divine

(57) ABSTRACT

A tracked vehicle has an electrohydraulic drive/steering system having an engine driven variable displacement hydraulic steering pump which drives a hydraulic steering motor which is coupled to a differential track drive mechanism via a transmission with multiple gear ratios. A steering wheel is coupled to a variable friction device which produces a variable friction force which resists rotation of the steering wheel. A control system is responsive to a position of the steering wheel and controls the steering pump displacement and controls the friction device. The control system sets the variable friction device to its high friction level when a limit of the steering pump displacement is reached when the transmission is in a higher one of its gear ratios.

16 Claims, 2 Drawing Sheets

TRACKED VEHICLE STEERING CONTROL SYSTEM WITH STEERING PUMP FEEDBACK

BACKGROUND OF THE INVENTION

The present invention relates to a tracked vehicle steering system, and more particularly, to a tracked vehicle steering system which has a steering wheel coupled to a variable friction device.

There are commercially available tracked vehicles with hydro-mechanical drive/steering systems which include an engine driven hydraulic steering pump which is responsive to steering pump control signals provided from a spring-centered steering wheel, and which drives a hydraulic steering motor. The steering motor drives a differential track drive mechanism which drives left and right tracks, and turns the vehicle at turning rates which depend on the magnitude of the steering pump control signals and engine speed. With such systems, the steering wheel position provides a direct indication of the position of swash plate of the pump, so the limit of pump capacity is coincidental with the limit of steering wheel rotation. While functional, such systems lack various features, and vehicles with such systems do not drive like cars or other familiar vehicles. For instance, though the position of the steering wheel indicates the swash plate position, the actual turn radius of the vehicle will depend on both the engine speed and ground speed.

A proposed electrohydraulic tracked vehicle drive/steering system has been described in U.S. Pat. 6,039,132, issued Mar. 21, 2000, and assigned to the assignee of this application. As described in U.S. Pat. No. 6,000,490, issued Dec. 14, 1999, and also assigned to the assignee of this application, there has also been proposed an electrohydraulic tracked vehicle drive/steering system which has a non-spring centered steering wheel coupled to a variable friction steering input device. The steering input device produces a variable, two-level friction force which resists turning of the steering wheel, provides feedback to the operator, simulates "end stops" on the steering wheel motion, and thus allows the tracked vehicles to drive more like wheeled vehicles. In this proposed system the higher friction level is turned on when a certain amount of steering wheel rotation is reached, similar to what occurs with a wheeled vehicle. But in higher gears of the vehicle transmission, the limit of steering pump stroke is reached before the corresponding amount of steering wheel rotation is reached. Thus, additional rotation of the steering wheel cannot cause a tighter turn. It would be desirable to provide the operator with an indication of when this condition is about to be reached.

SUMMARY OF THE INVENTION

Accordingly, an object of the present invention is to provide an electrohydraulic tracked vehicle steering system which provides the operator with an indication of when the limit of the steering pump stroke is reached when the transmission is in higher gear ratios.

These and other objects are achieved by the present invention, wherein a ratio of the desired or commanded steering motor speed to the engine speed is generated and compared to a limit value. When the ratio value reaches the limit, the limit of the steering pump is assumed to be imminent, and a variable friction steering input device coupled to the steering wheel is set to a high friction level. This indicates to the operator that the end of steering capability has been attained, and that a tighter turn radius should not be expected under such conditions. This is especially useful in a tracked vehicle with an electrohydraulic drive/steering system.

DESCRIPTION OF THE PREFERRED EMBODIMENT

Figure 1:
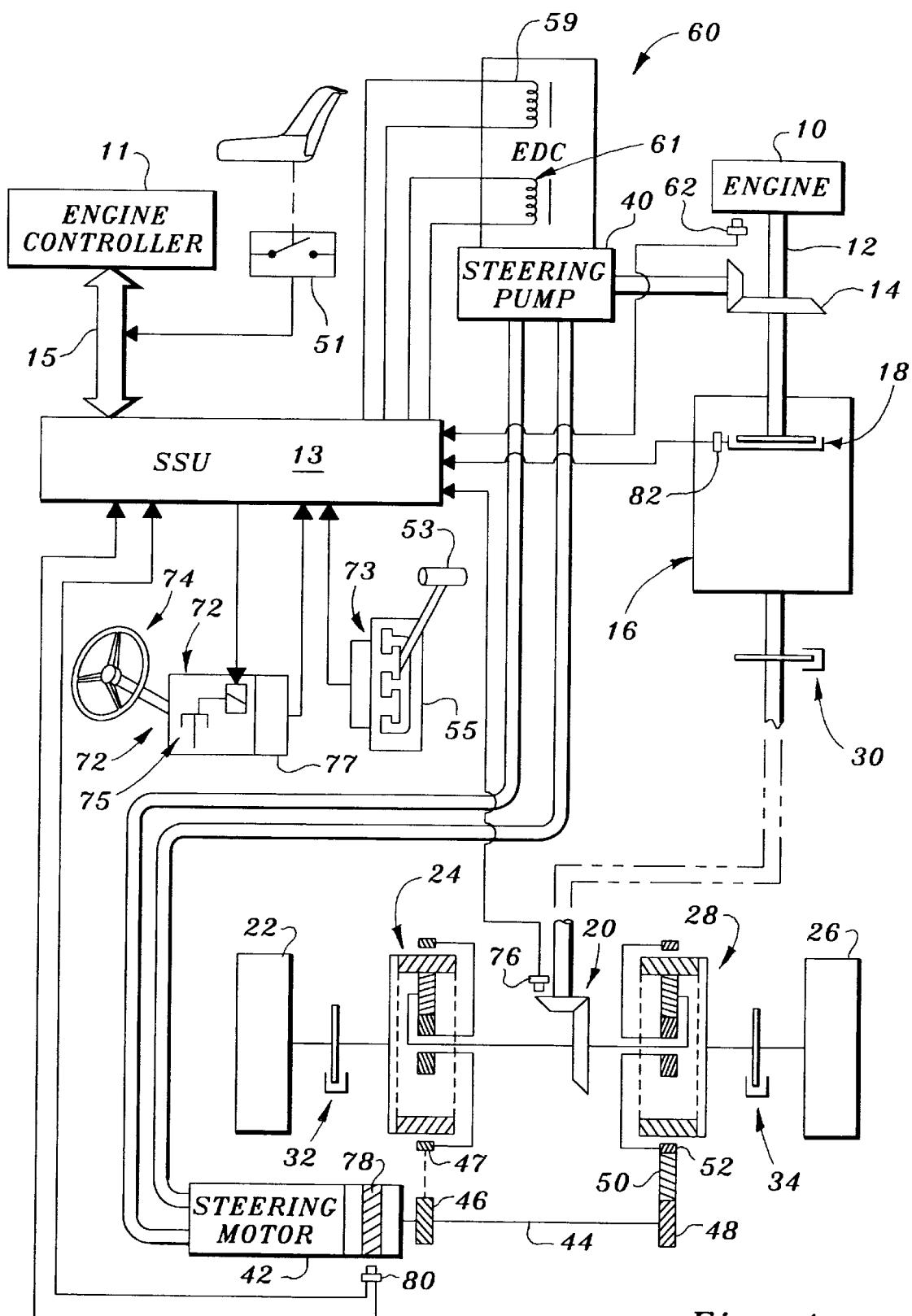
FIG. 1 is a simplified schematic diagram of a tracked vehicle drive/steering control system for use with the present invention.

Referring to FIG. 1, an engine 10 of a tracked vehicle has an output shaft 12 which drives a right angle gear 14 and a transmission 16, such as a 16-speed powershift transmission which is available on production John Deere 8000T tractors. The transmission 16 includes hydraulically operated clutches and brakes (not shown), various ones of which will operate as a main clutch 18 in response to a conventional clutch pedal and linkage (not shown). The engine 10 is controlled by an electronic engine control unit 11. The electronic engine control unit 11 is communicated with a steering system unit (SSU) 13 via a bus 15.

The transmission 16 drives a final or right angle drive 20, which drives a left track drive wheel 22 via left steering planetary drive 24, and a right track drive wheel 26 via right steering planetary drive 28. The steering planetary drives 24 and 28 are preferably such as described in U.S. Pat. No. 5,390,751, issued Feb. 21, 1995 to Puetz et al., and assigned to the assignee of this application. Additional outboard planetaries (not shown), as provided on John Deere 8000T tractors, are mounted between the steering planetaries and the respective drive wheels, but are not further described because they are not directly involved in the subject matter of this application. A parking brake 30 is coupled to the output shaft of transmission 16, and left and right service brakes 32, 34 are coupled to the left and right drive wheels 22, 26, respectively.

The right angle gear 14 drives a variable displacement steering pump 40, such as a 75 cc, 90 series pump made by Sauer-Sundstrand. The pump 40, in turn, powers a hydraulic fixed displacement steering motor 42, such as a 75 cc, 90 series motor, also made by Sauer-Sundstrand. The steering motor 42 drives, via a cross shaft 44 and gear 46, a ring gear 47 of left planetary drive 24, and via cross shaft 44, gear 48 and reverser gear 50, a ring gear 52 of right planetary drive 28.

The steering pump 40 has a swashplate (not shown), the position of which is controlled by a swashplate control valve or electronic displacement control (EDC) 60. The EDC is preferably a two stage device with first stage including a flapper type valve operated by a pair of solenoids 59, 61, and a second stage including a boost stage to the pump, such as is used on the production John Deere 8000T Series tracked tractor.

An operator presence switch 51 provides an operator seat presence signal to the SSU 13 via the bus 15. An engine speed sensor 62, such as a commercially available mag pickup, provides an engine speed signal to the SSU 13. The solenoids 59, 61 of valve 60 are controlled by pulse-width-modulated (PWM) pump control signals generated by SSU 13.

An operator controlled steering wheel 74 is preferably connected to a non-spring centered input mechanism 72, such as described in U.S. Pat. No. 6,000,490, issued Dec. 14, 1999, and assigned to the assignee of the present application. The input mechanism 72 includes an electromagnetically controlled friction device or brake 75 and a rotary position transducer or incremental encoder 77, such as a commercially available Grayhill Series 63R encoder or an Oak-Grigsby 900 Optical Encoder. The encoder 77 provides to SSU 13 a steering wheel position signal representing the position of operator controlled steering wheel 74. The encoder 77 generates a plurality, preferably 128, of pulses per each revolution of the steering wheel 74. The SSU 13 then repeatedly generates and updates a COUNT value representing the number of optical encoder pulses corresponding to the movement of the steering wheel 74 relative to the position of the steering wheel 74 at center. For example, a negative COUNT value will be generated when the steering wheel 74 is rotated counterclockwise from its center position, and a positive COUNT value will be generated when the steering wheel 74 is rotated clockwise from its center position. Thus, COUNT has a magnitude which is proportional to its angular displacement from its center position, and a sign representing the direction (clockwise or counterclockwise) from its center position.

The SSU 13 also receives gear shift command signals from gear shift lever mechanism 73, such as described in U.S. Pat. No. 5,406,860, issued Apr. 18, 1995 to Easton et al., and such as used on production John Deere 8000 Series tractors. The gear shift lever mechanism 73 includes a shift lever 53 which is movable to forward upshift and downshift, reverse upshift and downshift, neutral and park positions within a guide 55.

A drive line rotation speed sensor 76, preferably a differential Hall-effect speed sensor such as used on production John Deere 8000T tractors, is mounted in proximity to the final drive 20, and provides to the SSU 13 a variable frequency final drive speed or wheel speed signal. A magnetic ring 78 is mounted for rotation with the motor 42, and a Hall-effect transducer 80 mounted near the magnetic ring 78 provides to the SSU 13 an incremental motor position signal and a motor direction signal. A pair of clutch status switches 82 are located within the transmission 16 and are operatively associated with the linkage (not shown) between the clutch pedal (not shown) and the main clutch 18, and provide a clutch status signal to the SSU 13.

The SSU 13 includes a commercially available microprocessor (not shown) which generates the pump control signals which are communicated to the solenoids 59, 61 of valve 60. Preferably the pump control signals are generated as a function of the COUNT value as a result of the SSU executing a main control algorithm (not shown), such as described in pending U.S. patent application Ser. No. 09/456,702, filed Dec. 9, 1999, and assigned to assignee of the present application, and which is incorporated herein by reference.

Figure 2:
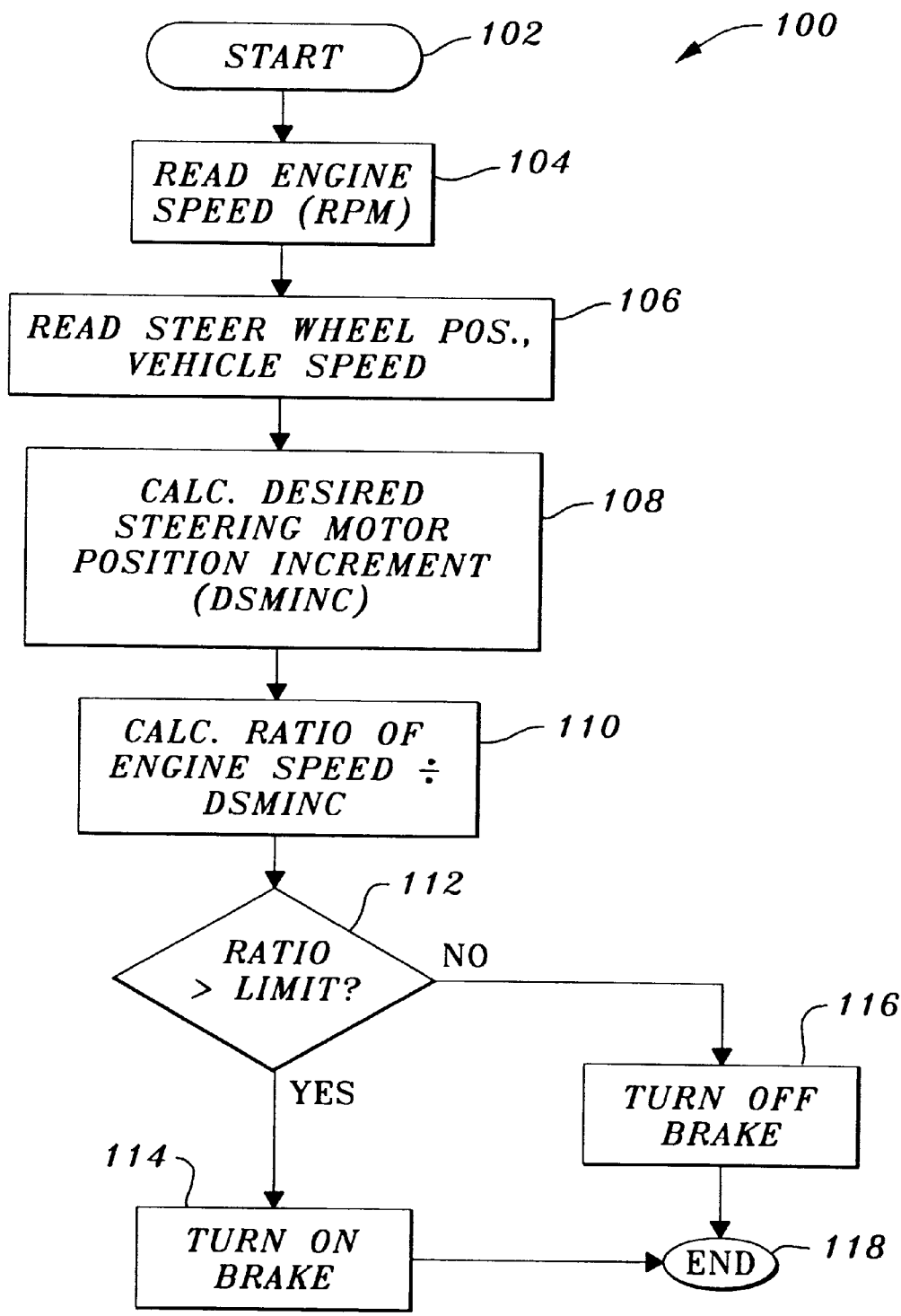
FIG. 2 is a logic flow diagram of an algorithm executed by a microprocessor-based control unit of the control system of FIG. 1 and which implements an embodiment of the present invention.

According to the present invention, preferably every 20 milliseconds, the SSU 13 also executes a subroutine or algorithm 100 which is illustrated by FIG. 2. The algorithm 100 starts at step 102. Step 104 reads the engine speed (rpm) signal from sensor 62. Step 106 reads the steering wheel position signal (COUNT) from encoder 77, and reads the vehicle speed signal (VEHSPD, in Hz) from sensor 76. Step 108 calculates a desired or commanded steering motor position increment (DSMINC) according to the following equation:

$$DSMINC=(COUNT \times VEHSPD)/500.$$

"Step 110 calculates a ratio value (RATIO) by dividing the engine speed by the desired steering motor position increment. If RATIO is greater than a threshold or limit, such as 11, step 112 directs the routine to step 114. Step 114 activates the friction device or brake 75 of the steering input device 72 so that the operator can feel that it is more difficult to turn the steering wheel 74, and so that the operator will be given an indication that the limit of steering pump stroke is being reached while the transmission 16 is in a higher gear ratio.

If in step 112, RATIO is not greater than the limit, then step 112 directs the routine to step 116 which deactivates the friction device or brake 75."

"Because the routine is periodically repeated, the routine operates to effectively convert the position increment value to a speed value. Thus, the routine effectively calculates a commanded steering motor speed, and generates a ratio value representing a ratio of the engine speed to the desired steering motor speed. Thus, the routine operates to generate an engine speed signal, to generate a commanded steering motor speed value, to generate a ratio value representing a ratio of the engine speed to the desired steering motor speed, to compares the ratio value to a limit value, and to control the variable steering friction device as a function of a relationship between the ratio value and the limit. Specifcally, the variable steering friction device is set to its high friction condition when the ratio value is above the limit, and is turned off when the ratio value is not above the limit."

Preferably, the friction device 75 is put into its high friction condition only when the steering wheel is being manipulated in an attempt to achieve a tighter turn (absolute value of COUNT increasing). Conversely, whenever the absolute value of COUNT is decreasing, the friction device or brake 75 is turned off or placed in its low friction condition.

The conversion of this flow chart into a standard language for implementing the algorithm described by the flow chart in a digital computer or microprocessor, will be evident to one with ordinary skill in the art.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. In a control system for a tracked vehicle drive/steering system, the tracked vehicle drive/steering system having an engine driven hydraulic steering pump which drives a hydraulic steering motor which is coupled to a differential track drive mechanism, the steering pump being responsive to a position of a steering wheel, the steering wheel being coupled to a variable friction device which produces a variable friction force which resists rotation of the steering wheel, the improvement wherein the control system comprises:

an engine speed sensor which generates an engine speed signal;

a ratio generator for generating a ratio value representing a ratio of the engine speed to a desired steering motor position increment value; and a comparator for comparing the ratio value to a limit value, and for controlling the variable friction device as a function of a relationship between the ratio value and said limit.

2. The control system of claim 1, further comprising:

a steering wheel position sensor which generates a steering wheel position signal; and a vehicle speed sensor which generates a vehicle speed signal, the desired steering motor position increment value being a function of the steering wheel position signal and of the vehicle speed signal.

3. The control system of claim 1, further comprising:

a steering wheel position sensor which generates a steering wheel position signal;

a vehicle speed sensor which generates a vehicle speed signal; and a desired steering motor position increment value calculator for calculating the desired steering motor position increment value as a product of the steering wheel position signal and of the vehicle speed signal.

4. The control system of claim 1, further comprising:

a steering wheel position sensor which generates a steering wheel position signal;

a vehicle speed sensor which generates a vehicle speed signal; and a desired steering motor position increment value calculator for calculating the desired steering motor position increment value as a product of the steering wheel position signal and of the vehicle speed signal, divided by a constant.

5. The control system of claim 1, further comprising:

the variable friction device is set to its high friction condition when the ratio value is above the limit, and is turned off when the ratio value is not above the limit.

6. In a control system for a tracked vehicle, the tracked vehicle having an electrohydraulic drive/steering system having an engine driven variable displacement hydraulic steering pump which drives a hydraulic steering motor which is coupled to a differential track drive mechanism via a transmission with multiple gear ratios, a steering wheel coupled to a variable friction device which produces a variable friction force which resists rotation of the steering wheel, the control system being responsive to a position of the steering wheel, controlling the steering pump displacement and controlling the variable friction device, the improvement wherein the control system comprises:

means for determining steering pump displacement; and feedback means for turning on the variable friction device when the means for determining indicates that a limit of the steering pump displacement is reached when the transmission is in a higher one of its gear ratios.

7. The control system of claim 6, wherein the feedback means comprises:

an engine speed sensor which generates an engine speed signal;

a ratio generator for generating a ratio value representing a ratio of the engine speed to a desired steering motor position increment value; and a comparator for comparing the ratio value to a limit value, and for setting the variable friction device to its high friction level when the ratio value reaches said limit.

8. The control system of claim 7, further comprising:

a steering wheel position sensor which generates a steering wheel position signal; and a vehicle speed sensor which generates a vehicle speed signal, the desired steering motor position increment value being a function of the steering wheel position signal and of the vehicle speed signal.

9. The control system of claim 7, further comprising:

a steering wheel position sensor which generates a steering wheel position signal;

a vehicle speed sensor which generates a vehicle speed signal; and a desired steering motor position increment value calculator for calculating the desired steering motor position increment value as a product of the steering wheel position signal and of the vehicle speed signal.

10. The control system of claim 7, further comprising:

a steering wheel position sensor which generates a steering wheel position signal;

a vehicle speed sensor which generates a vehicle speed signal; and a desired steering motor position increment value calculator for calculating the desired steering motor position increment value as a product of the steering wheel position signal and of the vehicle speed signal, divided by a constant.

11. In a control system for a tracked vehicle, the tracked vehicle having an electrohydraulic drive/steering system having a steering wheel and an engine driven variable displacement hydraulic steering pump which drives a hydraulic steering motor which is coupled to a differential track drive mechanism via a transmission with multiple gear ratios, the control system being responsive to a position of the steering wheel and controlling the steering pump displacement, the improvement wherein the control system comprises:

means for determining steering pump displacement; and feedback means for providing a feedback signal to the vehicle operator when the means for determining determines that a limit of the steering pump displacement is reached when the transmission is in a higher one of its gear ratios.

12. The control system of claim 11, wherein:

the steering wheel is coupled to a variable friction device which produces a variable friction force which resists rotation of the steering wheel, and the feedback means setting the variable friction device to a high friction level when said limit of the steering pump displacement is reached when the transmission is in a higher one of its gear ratios.

13. A method of controlling a tracked vehicle drive/steering system having an engine driven hydraulic steering pump which drives a hydraulic steering motor which is coupled to a differential track drive mechanism, the steering pump being responsive to a position of a steering wheel, the steering wheel being coupled to a variable friction device which produces a variable friction force which resists rotation of the steering wheel, the method comprising:

periodically generating an engine speed signal;

periodically generating a desired steering motor position increment value (DSMINC);

periodically calculating a ratio value (RATIO) by dividing the engine speed by the desired steering motor position increment value;

periodically comparing the ratio value to a limit value;

controlling the variable friction device as a function of a relationship between the ratio value and said limit.

14. The method of claim 13, wherein:

the desired steering motor position increment value (DSMINC) is calculated as a function of a steering wheel position signal (COUNT) and a vehicle speed signal.

15. The method of claim 14, wherein:

the desired steering motor position increment value is calculated according to the following equation:

$$DSMINC=(COUNT \times VEHSPD)/K,$$

where K is a constant.

16. The method of claim 13, further comprising:

setting the variable friction device to a high friction condition when the ratio value is above the limit; and setting the variable friction device to a low friction condition when the ratio value is not above the limit.

* * * * *